US012698676B2

(12) United States Patent
Schulman

(10) Patent No.: US 12,698,676 B2
(45) Date of Patent: Aug. 4, 2026

(54) COVERING WITH LIFT STRAP-BASED LEVELING SHIMS AND RELATED METHODS

(71) Applicant: Levolor, Inc., Atlanta, GA (US)

(72) Inventor: Michael Jay Schulman, Atlanta, GA (US)

(73) Assignee: Levolor, Inc., Atlanta, GA (US)

( * ) Notice: Subject to any disclaimer, the term of this patent is extended or adjusted under 35 U.S.C. 154(b) by 157 days.

(21) Appl. No.: 18/717,906

(22) PCT Filed: Dec. 7, 2022

(86) PCT No.: PCT/US2022/052090
§ 371 (c)(1),
(2) Date: Jun. 7, 2024

(87) PCT Pub. No.: WO2023/107535
PCT Pub. Date: Jun. 15, 2023

(65) Prior Publication Data

US 2025/0012141 A1 Jan. 9, 2025

Related U.S. Application Data

(60) Provisional application No. 63/287,253, filed on Dec. 8, 2021.

(51) Int. Cl.
*E06B 9/326* (2006.01)
*E06B 9/30* (2006.01)
(Continued)

(52) U.S. Cl.
CPC ................ *E06B 9/326* (2013.01); *E06B 9/30* (2013.01); *E06B 9/322* (2013.01); *E06B 9/38* (2013.01); *E06B 9/303* (2013.01)

(58) Field of Classification Search
CPC . E06B 9/30; E06B 9/303; E06B 9/322; E06B 9/326; E06B 2009/3225; E06B 9/38; E06B 9/384
See application file for complete search history.

(56) References Cited

U.S. PATENT DOCUMENTS 6,648,050 B1 * 11/2003 Toti ......................... E06B 9/322 242/375.3
9,464,478 B2 * 10/2016 Defenbaugh ........... E06B 9/386
(Continued)

FOREIGN PATENT DOCUMENTS

DE 19907810 A1 12/1999

OTHER PUBLICATIONS

International Search Report for PCT/US2022/052090, mailed on Apr. 5, 2023, 2 pages.

*Primary Examiner* — Daniel P Cahn
*Assistant Examiner* — John W Hanes, Jr.
(74) *Attorney, Agent, or Firm* — Dority & Manning, P.A.

(57) ABSTRACT

In one aspect, a covering for an architectural structure includes a headrail, a bottom rail, and first and second lift straps extending between the headrail and the bottom rail. The covering also includes first and second lift spools rotatable to spool up the first and second lift straps, respectively, as the bottom rail is being moved relative to the headrail. The first lift strap winds on top of itself as the first lift strap is spooled onto the first lift spool, and the second lift strap winds on top of itself as the second lift strap is spooled onto the second lift spool. In addition, the covering includes a leveling shim provided in association with the first lift strap to provide a localized increase in an effective thickness of the first lift strap.

23 Claims, 4 Drawing Sheets

(51) Int. Cl.

| | |
|---|---|
| ***E06B 9/322*** | (2006.01) |
| ***E06B 9/38*** | (2006.01) |
| *E06B 9/303* | (2006.01) |

(56) References Cited

U.S. PATENT DOCUMENTS

| | | | | |
|---|---|---|---|---|
| 9,702,184 | B2 * | 7/2017 | Gilmer | E06B 9/382 |
| 10,138,674 | B2 * | 11/2018 | Hsu | E06B 9/32 |
| 10,646,392 | B2 * | 5/2020 | Karlsson | A61G 7/1044 |
| 11,448,008 | B2 * | 9/2022 | Lei | B65H 75/4492 |
| 11,492,844 | B2 * | 11/2022 | Chen | E06B 9/322 |
| 2017/0044821 | A1 * | 2/2017 | Anderson | E06B 9/304 |
| 2017/0198521 | A1 * | 7/2017 | Zhang | E06B 9/322 |
| 2017/0306695 | A1 * | 10/2017 | Hsu | E06B 9/262 |
| 2018/0112460 | A1 * | 4/2018 | Huang | E06B 9/326 |
| 2018/0207884 | A1 * | 7/2018 | Nesbit | B29C 65/48 |
| 2019/0106936 | A1 * | 4/2019 | Huang | E06B 9/322 |
| 2020/0284089 | A1 * | 9/2020 | Spray | E06B 9/24 |
| 2021/0230941 | A1 * | 7/2021 | Stout | E06B 9/322 |
| 2022/0390211 | A1 * | 12/2022 | Adrain | E06B 9/382 |
| 2023/0042244 | A1 * | 2/2023 | Kirby | E06B 9/262 |
| 2023/0075977 | A1 * | 3/2023 | Queralt Monso | E06B 9/322 |
| 2025/0012141 | A1 * | 1/2025 | Schulman | E06B 9/303 |

* cited by examiner

COVERING WITH LIFT STRAP-BASED LEVELING SHIMS AND RELATED METHODS

FIELD

The present subject matter relates generally to coverings for architectural structures and, more particularly, to a covering including lift strap-based leveling shims to correct a skewed condition of a rail of the covering. In addition, the present subject matter is also directed to rail leveling methods that utilize the disclosed leveling shims.

BACKGROUND

Coverings, such as horizontal/Venetian blinds and other similar slatted blinds, typically include a headrail, a bottom rail, and a plurality of horizontally oriented slats configured to be supported between the headrail and the bottom rail via two or more sets of ladder tapes. Additionally, one or more lift cords typically extend between the headrail and the bottom rail for adjusting the position of the bottom rail relative to the headrail. In many instances, each lift cord passes through a set of aligned route holes defined in the slats and extends to a lift spool about which the lift cord is wound around and unwound from as the bottom rail is raised and lowered, respectively, relative to the headrail.

Recent product designs have proposed replacing the lift cords of a conventional Venetian blind with relatively wide (e.g., as compared to lift cords) strips of metal or metal ribbons. However, the use of such metal ribbons presents challenges in designing the lift system of the blind, particularly in designing a system that allows the bottom rail to be maintained in a level, horizontal orientation as it is raised relative to the headrail. For instance, unlike conventional lift cords that can be spooled onto a lift spool such that only a single wrap of the cord is provided at any given point along the length of the spool, current product designs require that the metal ribbons be spooled onto the lift spool at the same location such that the ribbon continuously wraps on top of itself, thereby creating a wound stack of ribbon having multiple spooling rotations on the spool. As such, any deviation between the spooled diameter of the metal ribbon at one lift station and the spooled diameter of the metal ribbon at the opposed lift station can result in the bottom rail being significantly skewed or non-level at the fully raised position.

Accordingly, an improved leveling configuration and related methods that address one or more of the above-described issues would be welcomed in the technology.

BRIEF SUMMARY

Aspects and advantages of the present subject matter will be set forth in part in the following description, or may be obvious from the description, or may be learned through practice of the present subject matter.

In one aspect, the present subject matter is directed to a covering for an architectural structure. The covering includes a headrail, a bottom rail, and first and second lift straps extending between the headrail and the bottom rail. The covering also includes first and second lift spools rotatable to spool up the first and second lift straps, respectively, as the bottom rail is being moved relative to the headrail. The first lift strap winds on top of itself as the first lift strap is spooled onto the first lift spool, and the second lift strap winds on top of itself as the second lift strap is spooled onto the second lift spool. In addition, the covering includes a leveling shim installed or applied onto an outer surface of the first lift strap. The leveling shim is configured to provide a localized increase in an effective thickness of the first lift strap so as to effect an increase in a spooled diameter of the first lift strap as the bottom rail is being moved relative to the headrail. Moreover, the leveling shim differs in material from a material forming the outer surface of the first lift strap.

In another aspect, the present subject matter is directed to a covering for an architectural structure. The covering includes a headrail, a bottom rail, and first and second lift straps extending between the headrail and the bottom rail. The covering also includes first and second lift spools rotatable to spool up the first and second lift straps, respectively, as the bottom rail is being moved relative to the headrail. The first lift strap winds on top of itself as the first lift strap is spooled onto the first lift spool, and the second lift strap winds on top of itself as the second lift strap is spooled onto the second lift spool. In addition, the covering includes a leveling shim provided in association with the first lift strap. The leveling shim is configured to provide a localized increase in an effective thickness of the first lift strap so as to effect an increase in a spooled diameter of the first lift strap as the bottom rail is being moved relative to the headrail.

In a further aspect, the present subject matter is directed to a rail leveling method for use with a covering for an architectural structure. The covering includes headrail, a bottom rail, first and second lift straps extending between the headrail and the bottom rail, and first and second lift spools coupled to the first and second lift straps, respectively. The first lift strap is configured to wind on top of itself as the first lift strap is spooled onto the first lift spool, and the second lift strap is configured to wind on top of itself as the second lift strap is spooled onto the second lift spool. The method includes moving the bottom rail to a raised position relative to the headrail, and identifying that the bottom rail has a skewed orientation when at the raised position, with the skewed orientation being characterized by the first lift strap defining an effective length that is greater than an effective length of the second lift strap. The method also includes moving the bottom rail to a lowered position relative to the headrail, and operatively associating at least one leveling shim with the first lift strap to provide a localized increase in an effective thickness of the first lift strap such that the effective length of the first lift strap will be increased when the bottom rail is subsequently moved back to the raised position.

These and other features, aspects, and advantages of the present subject matter will become better understood with reference to the following Detailed Description and appended claims. The accompanying drawings, which are incorporated in and constitute a part of this specification, illustrate embodiments of the present subject matter and, together with the description, serve to explain the principles of the present subject matter.

This Brief Description is provided to introduce a selection of concepts in a simplified form that are further described below in the Detailed Description. This Brief Description is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
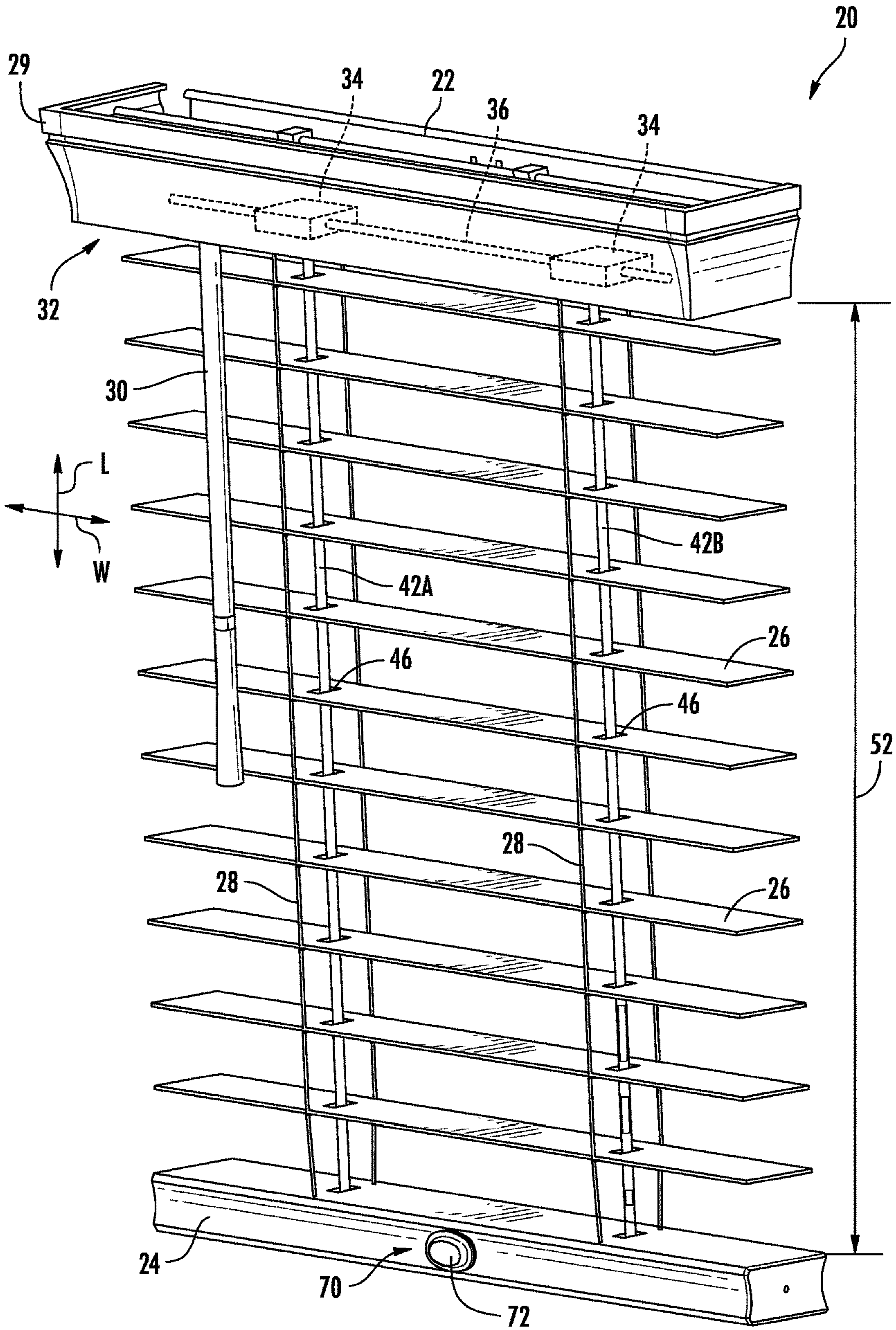
FIG. 1 illustrates a perspective view of one embodiment of a covering for an architectural structure.

In general, the present subject matter is directed to a covering for an architectural feature or structure (referred to herein simply as an architectural "structure" for the sake of convenience and without intent to limit) that can be configured to include features that facilitate leveling a rail of the covering. For instance, in several embodiments, the covering includes a headrail, a bottom rail, and first and second lift straps extending between the headrail and the bottom rail. The covering also includes first and second lift spools rotatable to spool up the first and second lift straps, respectively, as the bottom rail is being moved relative to the headrail. For instance, the first lift strap may be configured to wind on top of itself as the first lift strap is spooled onto the first lift spool, while the second lift strap may be configured to wind on top of itself as the second lift strap is spooled onto the second lift spool.

Additionally, in accordance with aspects of the present subject matter, the covering includes one or more leveling shims configured to be provided in operative association with one of the lift straps. In general, the leveling shim(s) is configured to provide a localized increase in an effective thickness of the associated lift strap so as to effect an increase in a spooled diameter of the lift strap as the bottom rail is being moved relative to the headrail. The increased spooled diameter of the lift strap may generally function to correct a skewed condition of the bottom rail.

In one embodiment, the leveling shim may be configured to be installed or applied onto an outer surface of the lift strap. For instance, in one embodiment, the leveling shim may correspond to a separate piece or strip of material (e.g., adhesive-backed taped) that is configured to be coupled to the outer surface of the lift strap. In another embodiment, the leveling shim may correspond to a localized coating that is applied to the outer surface of the lift strap. In further embodiments, the leveling shim may be formed by a deformed portion of the lift strap, itself. For instance, a portion of the lift strap may be deformed relative to adjacent portions of the lift strap to create a raised or non-planar feature that functions to increase the effective thickness of the lift strap.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

Figure 2:
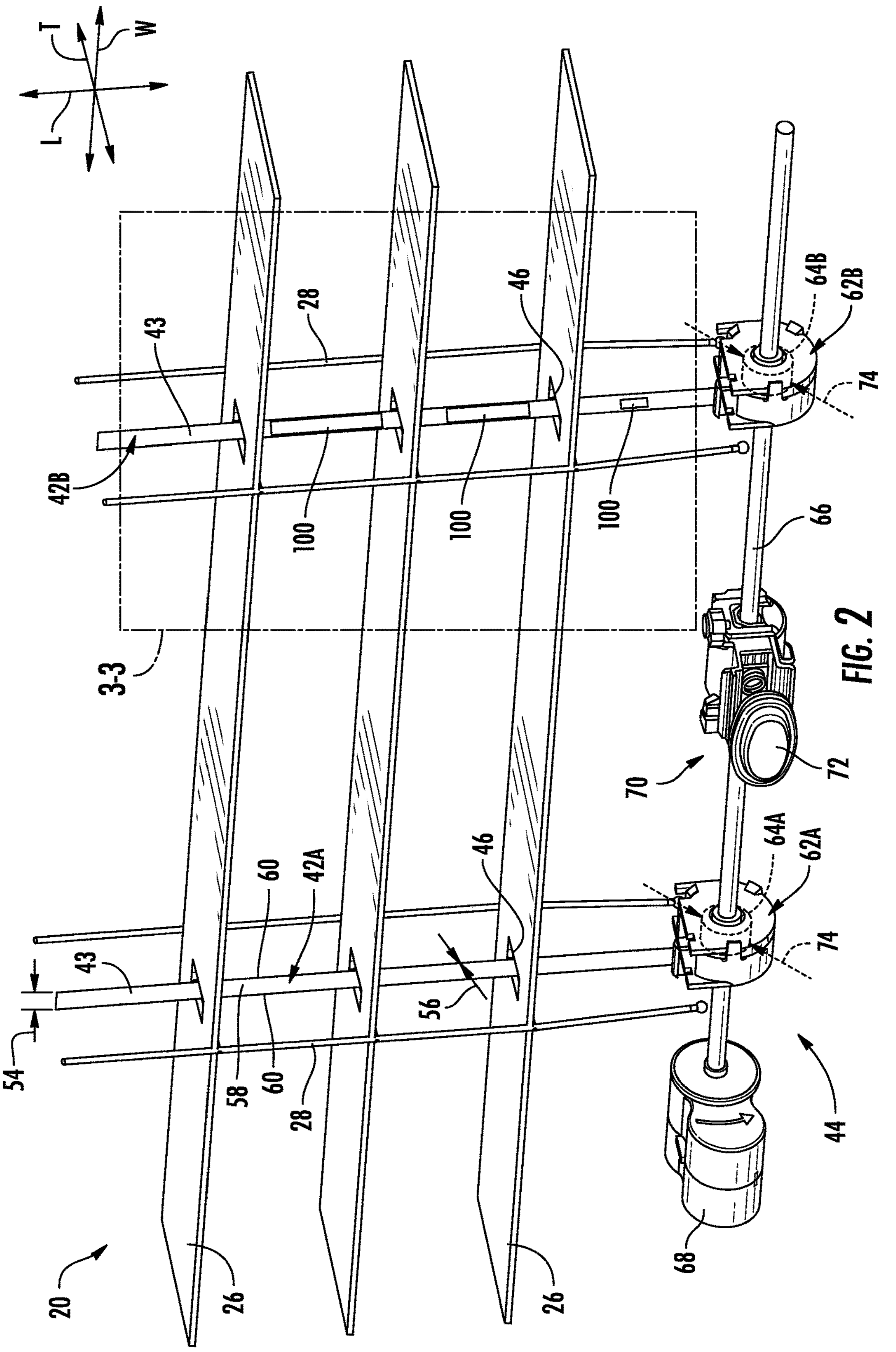
FIG. 2 illustrates a perspective view of a lower portion of the covering with the bottom rail removed for purposes of illustration, particularly illustrating various components of the lift system of the covering as well as one or more leveling shims provided in association with one of the lift straps of the lift system.

Referring now to the drawings, FIGS. 1 and 2 illustrate views of one embodiment of a covering 20 for an architectural structure (not shown) in accordance with aspects of the present subject matter. Specifically, FIG. 1 illustrates a perspective view of the covering 20 and FIG. 2 illustrates a perspective view of a lower portion of the covering 20 with a bottom rail of the covering 20 removed for purposes of illustration.

In general, the covering 20 is configured to be installed relative to a window, door, or any other suitable architectural structure as may be desired. In one embodiment, the covering 20 may be configured to be mounted relative to an architectural structure to allow the covering 20 to be suspended or supported relative to the architectural structure. It should be understood that the covering 20 is not limited in its particular use as a window or door shade, and may be used in any application as a covering, partition, shade, and/or the like, relative to and/or within any type of architectural structure.

In several embodiments, the covering 20 may be configured as a slatted blind, such as a Venetian-blind-type extendable/retractable covering. For example, in the embodiment shown in FIG. 1, the covering 20 includes a headrail 22, a bottom rail 24, and a plurality of horizontally disposed, parallel slats 26 configured to be supported between the headrail 22 and the bottom rail 24 via one or more ladder tapes 28 (e.g., a pair of ladder tapes 28). In one embodiment, the covering 20 may also include a valance or valance assembly 29 configured to be installed as a covering for the headrail 22 to provide a desired aesthetic appearance.

In several embodiments, the slats 26 are rotatable or tiltable about their longitudinal axes by manipulating the ladder tapes 28 to allow the slats 26 to be tilted between a horizontal or open position (e.g., as shown in FIG. 1) for permitting light to pass between the slats 26 and a closed position (not shown), wherein the slats 26 are substantially vertically oriented in an overlapping manner to occlude or block the passage of light through the covering 20. The ladder tapes 28 may be manipulated to allow the slats 26 to be tilted between their open and closed positions using, for example, a suitable tilt wand 30 or any other suitable control device forming part of a tilt system 32 provided in operative association with the covering 20. For example, as shown in dashed lines in FIG. 1, the covering 20 includes one or more components of the tilt system 32 within the headrail 22, such as a tilt station 34 provided in operative association with each ladder tape 28 and a tilt rod 36 coupled between the tilt wand 30 and the tilt stations 34. In such an embodiment, as the tilt wand 30 is manipulated by the user (e.g., by rotating the tilt wand 30 relative to the headrail 22), the tilt rod 36 may be rotated to rotationally drive one or more tilt drums (not shown) of the tilt stations 34, thereby allowing front and rear ladder rails (not shown) of each ladder tape 28 to be raised or lowered relative to each other to adjust the tilt angle of the slats 26.

Figure 4A:
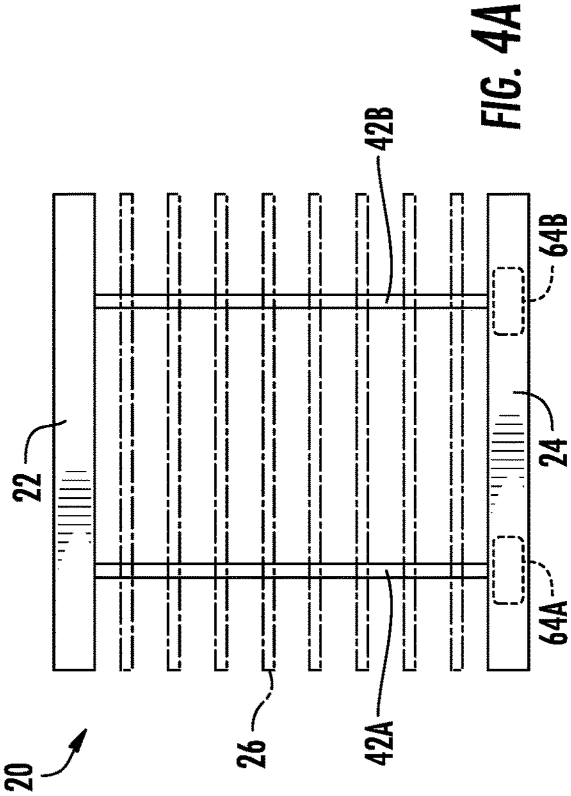
FIG. 4A illustrates a schematic view of a covering in accordance with aspects of the present subject matter, particularly a bottom rail of the covering at a lowered position relative to a headrail of the covering.
Figure 4B:
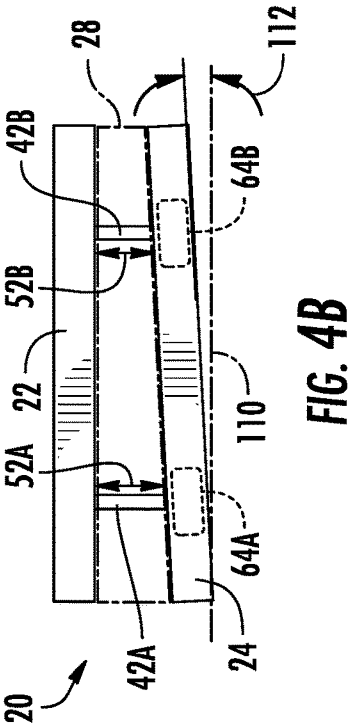
FIG. 4B illustrates another schematic view of the covering shown in FIG. 4A after the bottom rail has been moved to a raised position relative to the headrail, particularly illustrating a skewed condition or orientation of the bottom rail.
Figure 4C:
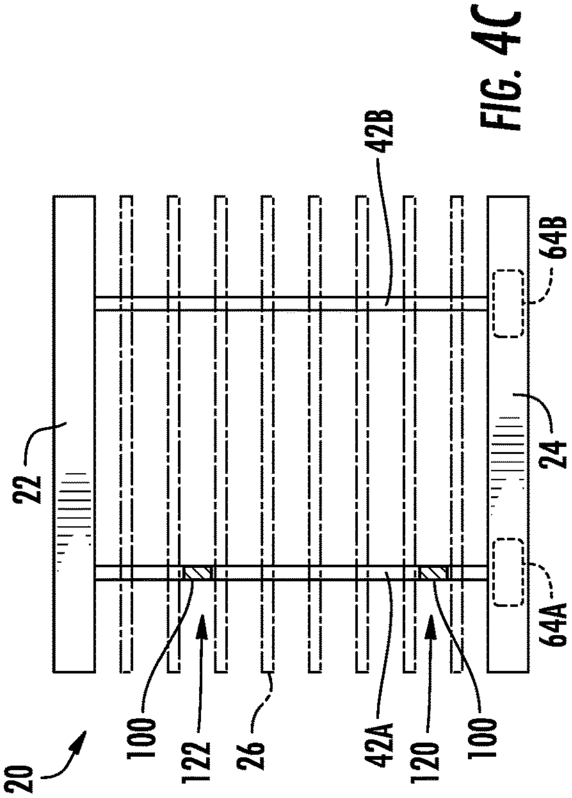
FIG. 4C illustrates same view of the covering shown in FIG. 4A after leveling shims have been installed relative to one of the lift straps of the covering in accordance with aspects of the present subject matter.
Figure 4D:
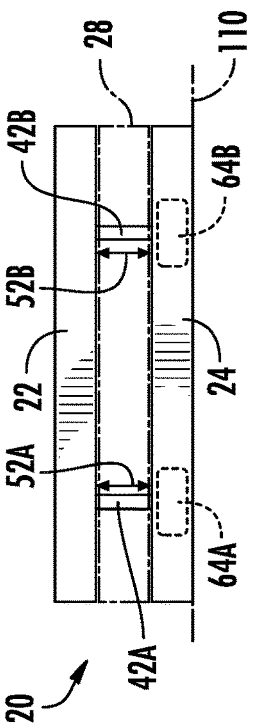
FIG. 4D illustrates another schematic view of the covering shown in FIG. 4C after the bottom rail has been moved to the raised position relative to the headrail, particularly illustrating the bottom rail having a level or non-skewed orientation due to the prior installation of leveling shims in accordance with aspects of the present subject matter.

Moreover, as shown FIGS. 1 and 2, the covering 20 also includes two or more lift straps 42 forming part of a lift system 44 (FIG. 2) for moving the covering 20 between a lowered or extended position (e.g., as shown in FIG. 1) and a raised or retracted position (see e.g., FIGS. 4B and 4D). In the illustrated embodiment, the covering 20 includes two lift straps (e.g., a first lift strap 42A and a second lift strap 42B) extending between the headrail 22 and the bottom rail 24 at spaced apart locations along the lateral width of the covering 20, with each lift strap 42 passing through a respective set of aligned route holes 46 defined in the slats 26. However, in other embodiments, the covering 20 may include three or more lift straps 42 extending between the headrail 22 and the bottom rail 24 at spaced apart locations along the lateral width of the covering 20.

Each lift strap 42 may generally be formed from or include an elongated strip of material. For instance, in one embodiment, each lift strap 42 may correspond to a strip of metal material, such as a metal ribbon. In other embodiments, each lift strap 42 may be formed from any other suitable material, such as an elongated strip of polymer material. In one embodiment, each lift strap 42 may be formed primarily from the elongated strip of material (e.g., the elongated strip of metal ribbon or polymer material) such that the outer surface of the strip of material defines an outer surface 43 (FIG. 2) of the lift strap 42. Alternatively, as will be described below, the elongated strip of material may be configured as a base layer or base material 48 (FIG. 3) of the lift strap 42, with an outer coating layer 50 (FIG. 3) covering or coating the base material 48. In such an embodiment, the outer coating layer 50 (FIG. 3) may generally define the outer surface 43 of the lift strap 42.

Additionally, in several embodiments, each lift strap 42 may generally be configured to extend in a lengthwise direction (indicated by arrow L) such that each lift strap 42 defines an effective length 52 (FIG. 1) between the headrail 22 and the bottom rail 24. Additionally, each lift strap 42 may define a strap width 54 (FIG. 2) in a widthwise direction (indicated by arrow W) of the lift strap 42 that is significantly greater than a thickness 56 (FIG. 2) of the lift strap 42 defined in a thickness direction (indicated by arrow T) of the lift strap 42. For instance, in one embodiment, a ratio of the strap width 54 to the strap thickness 56 may be greater than or equal to 5:1, such as a width-to-thickness ratio that is greater than or equal to 7:1, or greater than or equal to 10:1 or greater than or equal to 15:1 or greater than or equal to 20:1. With such a width-to-thickness ratio, each lift strap 42 may generally include relatively broad outer faces 58 (FIG. 2) (only one of which is shown) extending in the widthwise direction W between relatively thin outer edges 60 (FIG. 2).

In several embodiments, each lift strap 42 may be configured to extend to a corresponding lift station 62 of the lift system 44 (e.g., a first lift station 62A and a second lift station 62B) to control the vertical positioning of the bottom rail 24 relative to the headrail 22. For instance, as particularly shown in FIG. 2, each lift strap 42A, 42B is operatively coupled to a respective lift station 62A, 62B housed within the bottom rail 24. In such an embodiment, a bottom end (not shown) of the lift strap 42A, 42B is configured to be coupled to its associated lift station 62A, 62B while an opposed end (not shown) of the lift strap 42A, 42B is configured to be coupled to the headrail 22. For example, each lift station 62A, 62B may include a lift spool 64 (e.g., a first lift spool 64A and a second lift spool 64B) for winding and unwinding the respective lift straps 42A, 42B. Thus, as the bottom rail 24 is raised relative to the headrail 22, each lift strap 42A, 42B is wound around its respective lift spool 64A, 64B. Similarly, as the bottom rail 24 is lowered relative to the headrail 22, each lift strap 42A, 42B is unwound from its respective lift spool 64A, 64B.

Additionally, the lift system 44 of the covering 20 may also include a lift rod 66 operatively coupled to the lift stations 62A, 62B and a spring motor 68 operatively coupled to the lift rod 66. As is generally understood, the spring motor 68 may be configured to store energy as the bottom rail 24 is lowered relative to the headrail 22 and release such energy when the bottom rail 24 is being raised relative to the headrail 22 to assist in moving the covering 20 to its retracted position. It should be appreciated that, in one embodiment, the spring motor 68 may be overpowered. In such an embodiment, to prevent unintended motion of the bottom rail 24 relative to the headrail 22, a brake assembly 70 may be provided within the bottom rail 24 and may be operatively coupled to the lift rod 66 to stop rotation of the lift rod 66. As shown in FIG. 1, the brake assembly 70 may include an actuator button 72 coupled to or otherwise supported by the bottom rail 24. To actuate the brake assembly 70, the button 72 that can be depressed to release or disengage the brake assembly 70 from the lift rod 66, thereby allowing the lift rod 66 to be rotated in a manner that permits the lift straps 42A, 42B to be wound around or unwound from their respective lift spools 64A, 64B as the bottom rail 24 is lowered or raised, respectively, relative to the headrail 22. In other embodiments, the spring motor 68 may not be overpowered, thereby eliminating the need for the brake assembly 70. For example, in one embodiment, the spring motor 68 may be adapted to provide a variable torque, thereby allowing the lift system 44 to be configured as a balanced operating system.

It should be appreciated that the configuration of the covering 20 described above and shown in FIG. 1 is provided only to place the present subject matter in an exemplary field of use. Thus, it should be apparent that the present subject matter may be readily adaptable to any suitable manner of covering configuration. For example, in other embodiments, the various components of the lift system 44 may be housed within the headrail 22 as opposed to being housed within the bottom rail 24.

As indicated above, as the bottom rail 24 is raised relative to the headrail 22, the lift straps 42A, 42B are wound around or otherwise spooled onto the associated lift spools 64A, 64B. In general, each lift strap 42A, 42B is configured to be wound around its respective lift spool 64A, 64B in a single vertical plane extending perpendicular to the width 54 of the lift strap 42A, 42B such that the lift strap 42A, 42B is continuously wound on top of itself as it spooled onto the lift spool 64A, 64B, thereby creating a coiled strap configuration having multiple spooling rotations on the spool 64A, 64 and defining a given spooled diameter 74. Due to such spooling of the lift straps 42A, 42B, any deviation between the effective spooled diameter 74 of the first lift strap 42A on the first lift spool 64A and the effective spooled diameter 74 of the second lift strap 42B on the second lift spool 64B will result in the bottom rail 24 being skewed or non-level at the fully raised position. For instance, the thicknesses 56 of the lift straps 42A, 42B may often vary at one or more locations along the length of each lift strap 42A, 42B due to manufacturing tolerances. In such instance, the lift strap having a greater average thickness along its length (hereinafter referred to as the "thicker lift strap") will have a larger wound or spooled diameter on its respective lift spool than the lift strap having a smaller average thickness along its length (hereinafter referred to as the "thinner lift strap"), which will result in more of the length of the thicker lift strap being wound onto the spool with each rotation of the lift rod 66. As a result, when the bottom rail 24 is moved to its fully raised position, the thinner lift strap will have a longer effective length than the thicker lift strap. Thus, the side of the bottom rail 24 on which the lift strap with the longer effective length (e.g., the thinner lift strap) is located will be positioned lower than the opposed side of the bottom rail 24, thereby providing a skewed or non-level condition of the bottom rail 24 at the raised position.

In accordance with aspects of the present subject matter, the above-described issues may be addressed by providing one or more leveling shims 100 in operative association with one of the lift straps to adjust the effective thickness of such lift strap and, thus, provide a corresponding adjustment to the spooled diameter of the lift strap. Specifically, in several embodiments, one or more leveling shims 100 may be installed/applied on or formed in the lift strap having the smaller effective spooled diameter (e.g., the "thinner" lift strap having a smaller average thickness along its length) to provide a localized increase in the effective thickness of the lift strap, thereby allowing the spooled diameter of such lift strap to be increased to a diameter that is equal or substantially equal to the spooled diameter of the other lift strap (e.g., the "thicker" lift strap having a greater average thickness along its length) when the bottom rail 24 is at its raised position. As such, with the spooled diameters of both lift straps being substantially equal to one another, the bottom rail 24 may have a level orientation when lifted to its fully raised position. It should be appreciated that, as used herein, the spooled diameters of the lift straps may be considered to be substantially equal to each other when one spooled diameter differs from the other spooled diameter by less than 3%, such as less than 2% or less than 1% or less than 0.5% or less than 0.2% or less than 0.1% and any other subranges therebetween.

Figure 3:
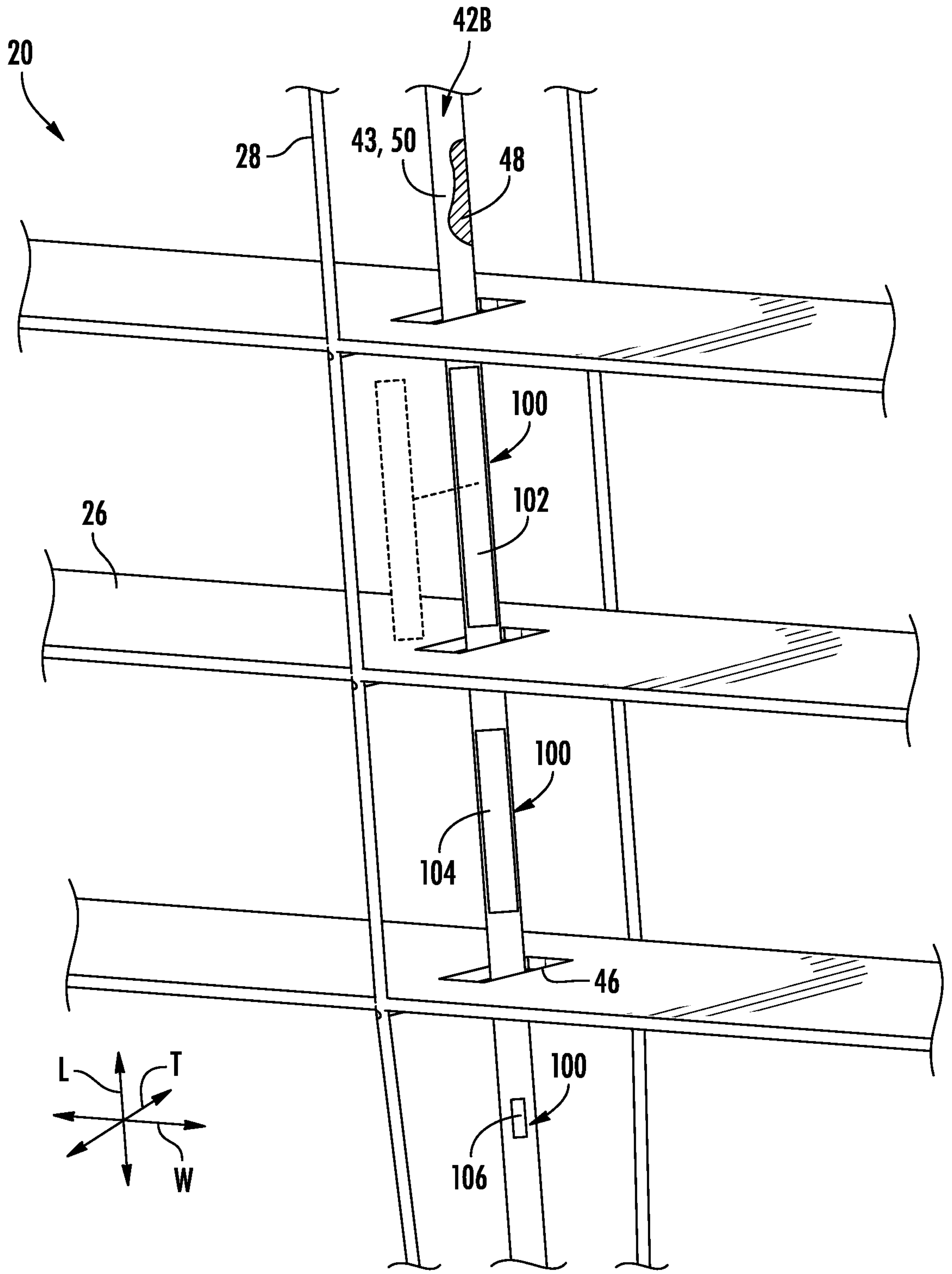
FIG. 3 illustrates a zoomed-in view of the portion of the covering shown in FIG. 2 that is contained within box 3-3, particularly illustrating various different embodiments of leveling shims in accordance with aspects of the present subject matter.

FIG. 3 illustrates a zoomed-in view of the portion of the covering 20 contained within box 3-3 in FIG. 2, particularly illustrating various examples of different leveling shims 100 that may be provided in association with one of the lift straps 42 of the covering 20 (e.g., the second lift strap 42B) to correct a skewed condition of the bottom rail 24. As indicated above, each leveling shim 100 may generally be used to provide a localized increase in the effective thickness of the lift strap 42B. In this regard, each leveling shim 100 may be configured to be installed or applied onto (or otherwise created in association with) a portion of the lift strap 42B that will ultimately be wound around or otherwise spooled onto its respective lift spool 64B as the bottom rail 24 is lifted to its fully raised position. Thus, when such portion of the lift strap 42B is wound onto the lift spool 64B, the increase in effective thickness provided by the leveling shim(s) 100 results in an overall increase in the spooled diameter 74 (FIG. 2) of the lift strap 42B.

As shown in FIG. 3, in one embodiment, each leveling shim 100 may correspond to a separate piece or strip of material 102 that is configured to be attached to the outer surface 43 of the associated lift strap 42B at a given location. For instance, each leveling shim 100 may correspond to a piece or strip of adhesive-backed tape that can be adhered to the outer surface 43 of the lift strap 42B along one of its outer faces 58. Alternatively, each leveling shim 100 may correspond to a non-adhesive-backed piece or strip of material that can be separately attached to the outer surface 43 of the lift strap 42B using any suitable attachment means and/or methodology (e.g., separately applied adhesive, magnets, welding, fasteners, and/or the like). In an embodiment in which the lift strap 42B is formed from a metallic material, the leveling shim 100, itself, may be a magnet that can be magnetically coupled to the lift strap 42B at a given location to provide an increase in the effective thickness of the strap 42B at such location.

In another embodiment, as shown in FIG. 3, each leveling shim 100 may correspond to a coating 104 that has been locally applied on the outer surface 43 of the associated lift strap 42B at a given location to provide for a localized increase in the effective thickness of the strap 42B. For instance, each leveling shim 100 may be formed directly on the outer surface 43 of the lift strap 42B via the application of a coating material thereto. As one example, a UV-curable coating material may be locally applied onto the outer surface 43 of the lift strap 42B (e.g., via painting) and subsequently cured to form the leveling shim 100 along the outer surface 43 of the lift strap 42B.

It should be appreciated that, in instances in which each leveling shim 100 corresponds to a separate strip of material 102 or a coating 104, the leveling shim 100 may be configured to be formed from a material that differs from the material forming the outer surface 43 of the lift strap 42B. For instance, when the lift strap 42B is formed from a non-coated metal ribbon, the leveling shim 100 may be formed from a non-metallic material or a metal material that differs from the metal material used to form the metal ribbon. Similarly, when the lift strap 42B is formed from a non-coated strip of polymer material, the leveling shim 100 may be formed from a non-polymeric material or a polymer material that differs from the polymer material used to form the strap 42B. Alternatively, as shown in FIG. 3 via the partially removed outer coating layer, when the lift strap 42B includes a base material layer 48 (e.g., a metal ribbon or a strip of polymer material) and an outer coating layer 50 provided on top of the base layer 48 such that outer coating layer 50 defines the outer surface 43 of the lift strap 42B, the leveling shim 100 may be formed from a material that differs from the material used to form the outer coating layer 50. For instance, in certain embodiments, the outer coating layer 50 may correspond to an outer paint layer that has been applied to the base material layer 48 to allow the lift strap 42B to have a given color (e.g., a color that matches the color of the slats). In such embodiments, the leveling shim 100 may be formed from a material that differs from the material used to form the outer paint layer, such as by forming the leveling shim 100 from a non-paint material.

It should also be appreciated that, in embodiments in which each leveling shim 100 corresponds to a separate strip of material 102 or a coating 104, it may be desirable for such strip of material 102 and/or coating 104 to be transparent, thereby rendering the shim 100 practically invisible to a user of the covering 20. However, in other embodiments, each leveling shim 100 may be formed from an opaque material (e.g., an opaque strip of material or an opaque coating material). In such embodiments, it may be desirable to color-match the opaque shim material to the color of the lift strap 42B.

In a further embodiment, each leveling shim 100 may correspond to a non-planar or deformed portion 106 of the lift strap 42B itself. Specifically, the lift strap 42B may be crimped, folded, dimpled, bent, and/or otherwise deformed to create a non-planer feature in the lift strap 42B that creates a localized increase in the effective thickness of the strap 42B. For instance, the lift strap 42B may be deformed to create a bump, rib, or other raised feature relative of adjacent portions of the lift strap 42B such that, when the lift strap 42B is subsequently wrapped on top of itself during spooling, the raised feature functions as a leveling shim to cause an increase in the spooled diameter 74 of the lift strap 42B.

It should be appreciated that the various embodiments of the leveling shims 100 described above were all shown together in FIGS. 1-3 (particularly FIG. 3) for ease of illustration and explanation. As such, one of ordinary skill in the art will appreciate that each type of leveling shim 100 (e.g., a separate piece/strip of material 102, a coating 104, and a deformed portion 106 of the lift band) can be used individually and, thus, need not be used in combination with other types of leveling shims 100. For instance, in one embodiment, each leveling shim 100 used in association with a given lift strap 42 may be a separate piece/strip material 102 that is attached to outer surface 43 of the lift strap 42, such as by using adhesive-backed strips of tape to form the leveling shims 100.

An example rail leveling method that can be implemented using the disclosed leveling shims 100 will now be described with reference to FIGS. 4A-4D. In general, FIGS. 4A-4D illustrate several schematic views of the covering 20 described above with reference to FIGS. 1-3. As such, the covering generally includes a headrail 22, a bottom rail 24, and a plurality of slats 26 (shown in dashed lines) supported between the headrail 22 and the bottom rail 24 (e.g., via ladder tapes (not shown)). Additionally, the covering 20 includes first and second lift straps 42A, 42B extending between the headrail 22 and the bottom rail 24, with each lift strap 42A, 42B being coupled to and windable around a corresponding lift spool 64A, 64B positioned in the bottom rail 24. For the purpose of describing an example of the disclosed rail leveling method, it will be assumed that a variation in average thickness exists between the lift straps 42A, 42B, with the first lift strap 42A having a smaller average thickness across its length than the second lift strap 42B.

Referring initially to FIGS. 4A and 4B, the covering 20 is illustrated without any leveling shims 100 provided in association with either of the lift straps 42A, 42B, with FIG. 4A showing the bottom rail 24 positioned at a fully extended position relative to the headrail 22 and FIG. 4B showing the bottom rail 24 positioned at a fully raised position relative to the headrail 22. As shown in FIGS. 4A and 4B, due to the variation in average thickness between the first and second lift straps 42A, 42B, the bottom rail 24 generally transitions from a level or horizontal orientation at the fully extended position to a non-level or skewed orientation at the fully raised position. Specifically, since the second lift strap 42B has a greater average thickness along its length that the first lift strap 42B (and, thus, will have a larger spool diameter 74 (FIG. 2) on its respective spool 64B than the first lift strap 42A), the thicker, second lift strap 42B will spool at a faster rate than the thinner, first lift strap 42A, thereby resulting in more of the second lift strap 42B being wound onto its spool 64B with each rotation of the lift rod 66 (FIG. 2). As a result, as shown in FIG. 4B, when the bottom rail 24 is moved to its fully raised position, the second lift strap 42B will define an effective length 52B that is shorter than an effective length 52A of the first lift strap 42A, which, in turn, causes the bottom rail 24 to have a skewed or non-level orientation relative to a horizontal plane 110 (e.g., a skew angle 112 relative to the plane 110).

To address this issue, one or more leveling shims 100 may be provided in operative association with the thinner, first lift strap 42A to provide a localized increase in the effective thickness of the first lift strap 42A and, thus, facilitate an overall increase in the spooled diameter 74 (FIG. 2) of such lift strap 42A relative to the spooled diameter 74 (FIG. 2) of the second lift strap 42B. As will be described below, the specific thickness, length, number, and/or location of the leveling shim(s) 100 provided in association with the first left strap 42A may be selected such that the spooled diameter 74 of the first lift strap 42A is equal or substantially equal to the spooled diameter 74 of the second lift strap 42B when the bottom rail 24 is disposed at its fully raised position. For instance, in the illustrated embodiment shown in FIG. 4C, the first lift strap 42A has been modified to include two leveling shims 100 at spaced apart locations along the length of the lift strap 42B. As described above with reference to FIG. 3, each of such leveling shims 100 may take the form of a separate strip/piece of material 102 that is attached to the lift strap 42B, a coating 104 that is applied to the lift strap, and/or a deformed portion 106 of the lift strap 42B itself.

As shown in 4D, by using the leveling shims 100, the bottom rail 24 may achieve a level, non-skewed orientation at its fully raised position despite the first lift strap 42A having a smaller average thickness across its length than the second lift strap 42B. Specifically, the additional thickness added to the first lift strap 42A results in an increase in the spooled diameter 74 of the first lift strap 42A such that the first and second lift straps 42A, 42B generally spool onto their respective lift spools 64A, 64B at the same rate. As a result, as shown in FIG. 4D, when the bottom rail 24 is moved to its fully raised position, the effective length 52A of the first lift strap 42A will be the same or substantially the same as the effective length 52B of the second lift strap 42B, which, in turn, causes the bottom rail 24 to have a level, non-skewed orientation relative to the horizontal plane 110. It should be appreciated that, as used herein, the effective lengths of the lift straps may be considered to be substantially equal to each other when one effective length differs from the other effective length by less than 3%, such as less than 2% or less than 1% or less than 0.5% or less than 0.2% or less than 0.1% and any other subranges therebetween.

It should be appreciated that, in certain instances, the above-described rail leveling methodology may be performed at the manufacturing stage of a covering. For instance, once the covering 20 is fully assembled, an assembly worker can lift the bottom rail 24 to its fully raised position to determine whether (and to what extent) the rail 24 is skewed. In the event that the bottom rail 24 does in fact have a skewed orientation, the assembly worker can measure the magnitude of the skew and can also identify the lift strap 42 defining the longest effective length while the bottom rail is maintained at its fully raised position. The rail 24 can then be lowered to allow one or more leveling shims 100 to be provided in association with the identified lift strap 42. Upon installation of the leveling shim(s) 100, the bottom rail 24 can again be lifted to its raised position to confirm whether the skewed condition has been fully corrected.

It should also be appreciated that, when attempting to level a skewed bottom rail 24, the specific thickness, length, number, and/or location of the leveling shim(s) 100 that needs to be provided in association with the "thinner" lift strap may generally vary or depend on the degree of magnitude of the skew angle 112 of the bottom rail 24 (or the difference between the effective lengths 52A, 52B of the lift straps 42A, 42B when the bottom rail 24 is at its fully raised position). Specifically, as the thickness and/or length of the leveling shim 100 is increased, the greater the impact on the resulting effective length 52 of the associated lift strap 42 (i.e., as the shim thickness/length is increased, the effective length 52 of the lift strap 42 will be reduced to a greater degree when the rail 24 is moved to the raised position). Similarly, as the number of leveling shims 100 used is increased, the greater the impact on the resulting effective length 52 of the associated lift strap 42 (i.e., as the number of shims 100 is increased, the effective length 52 of the lift strap 42 will be reduced to a greater degree when the rail 24 is moved to the raised position). As such, if the bottom rail 24 has a significantly skewed orientation, it may be necessary to install a thicker and/or longer leveling shim 100 on the appropriate lift strap 42 (and/or multiple leveling shims 100 on such lift strap 42). In contrast, if the bottom rail 24 is only slightly skewed, it may only be necessary to install a thinner and/or shorter leveling shim 100 on the appropriate lift strap 42. Moreover, the impact of the leveling shim 100 will also vary depending on the vertical location at which the shim 100 is positioned on the lift strap 42. Specifically, with the bottom rail 24 at the fully extended position, a leveling shim 100 installed on a lift strap 42 at a vertical location that is closer to the bottom rail 24 will have a greater impact on the resulting effective length of the lift strap 42 than a leveling shim 100 installed at a vertical location closer to the headrail 22. As such, if the bottom rail 24 has a significantly skewed orientation, it may be necessary to install a leveling shim(s) 100 at a location closer to the bottom rail 24 (e.g., at location 120 in FIG. 4C). In contrast, if the bottom rail 24 is only slightly skewed, it may be necessary to install a leveling shim 100 at a location closer to the headrail (e.g., at location 122 in FIG. 4C).

Given the various combinations of thicknesses, lengths, numbers, and locations that can be achieved with the leveling shims 100, it may be desirable, in practice, to limit the number of variables to facilitate efficient and effective leveling of the bottom rail 24, particularly when doing so in a manufacturing setting. For example, in one embodiment, leveling shims 100 may be provided that are all of uniform thickness and length. In such an embodiment, the number of leveling shims 100 used and the location(s) of such shim(s) 100 may be varied to accommodate varying magnitudes of rail skew. For instance, a look-up table may be developed that correlates the difference in effective length 52A, 52B between the lift straps 42A, 42B to a specific number of leveling shims 100 to be used and a specific location(s) for each shim 100. As such, once the magnitude of the rail skew is determined, the look-up table may be referenced to quickly and easily identify how many leveling shims 100 must be used and the installation location(s) for the shim(s) 100.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below; vertical, horizontal, crosswise, radial, axial, clockwise, counterclockwise, and/or the like) are only used for identification purposes to aid the reader's understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed is:

1. A covering for an architectural structure, the covering comprising:
- a headrail;
- a bottom rail;
- first and second lift straps extending between the headrail and the bottom rail;
- first and second lift spools rotatable to spool up the first and second lift straps, respectively, as the bottom rail is being moved relative to the headrail, the first lift strap winding on top of itself as the first lift strap is spooled onto the first lift spool, the second lift strap winding on top of itself as the second lift strap is spooled onto the second lift spool;
- a leveling shim installed or applied onto an outer surface of the first lift strap, the leveling shim being configured to provide a localized increase in an effective thickness of the first lift strap so as to effect an increase in a spooled diameter of the first lift strap as the bottom rail is being moved relative to the headrail,
- wherein the leveling shim differs in material from a material forming the outer surface of the first lift strap.

2. The covering of claim 1, wherein the leveling shim comprises a separate piece of material that is coupled to the outer surface of the first lift strap.

3. The covering of claim 2, wherein the separate piece of material is adhered to the outer surface of the first lift strap.

4. The covering of claim 1, wherein the leveling shim comprises a localized coating formed on the outer surface of the first lift strap.

5. The covering of claim 1, wherein the first lift strap comprises an elongated strip of material having an outer coating layer, the outer coating layer defining the outer surface of the first lift strap.

6. The covering of claim 5, wherein the leveling shim comprises a separate piece of material that is coupled to the outer coating layer of the first lift strap.

7. The covering of claim 5, wherein the leveling shim comprises an additional localized coating formed on the outer coating layer of the first lift strap.

8. The covering of claim 5, wherein the elongated strip of material comprises a metal ribbon.

9. The covering of claim 8, wherein the outer coating layer comprises an outer paint layer applied to the metal ribbon.

10. The covering of claim 1, wherein the first lift strap comprises a metal ribbon.

11. The covering of claim 1, wherein the first lift strap comprises a polymer strip of material.

12. The covering of claim 1, wherein the first lift strap has a first average thickness along a length of the first lift strap and the second lift strap has a second average thickness along a length of the second lift strap, the first average thickness being less than the second average thickness.

13. A covering for an architectural structure, the covering comprising:
- a headrail;
- a bottom rail;
- first and second lift straps extending between the headrail and the bottom rail;
- first and second lift spools rotatable to spool up the first and second lift straps, respectively, as the bottom rail is being moved relative to the headrail, the first lift strap winding on top of itself as the first lift strap is spooled onto the first lift spool, the second lift strap winding on top of itself as the second lift strap is spooled onto the second lift spool;
- a leveling shim provided in association with the first lift strap, the leveling shim being configured to provide a localized increase in an effective thickness of the first lift strap so as to effect an increase in a spooled diameter of the first lift strap as the bottom rail is being moved relative to the headrail.

14. The covering of claim 13, wherein the leveling shim is installed or applied onto an outer surface of the first lift strap.

15. The covering of claim 14, wherein the leveling shim comprises one of a separate piece of material that is coupled to the outer surface of the first lift strap or a localized coating formed on the outer surface of the first lift strap.

16. The covering of claim 14, wherein the leveling shim differs in material from a material forming the outer surface of the first lift strap.

17. The covering of claim 13, wherein the leveling shim comprises a deformed portion of the first lift strap that has been deformed relative to adjacent portions of the first lift strap to provide the localized increase in the effective thickness of the first lift strap.

18. The covering of claim 13, wherein the first lift strap has a first average thickness along a length of the first lift strap and the second lift strap has a second average thickness along a length of the second lift strap, the first average thickness being less than the second average thickness.

19. A rail leveling method for use with a covering for an architectural structure, the covering comprising a headrail, a bottom rail, first and second lift straps extending between the headrail and the bottom rail, and first and second lift spools coupled to the first and second lift straps, respectively, the first lift strap configured to wind on top of itself as the first lift strap is spooled onto the first lift spool, the second lift strap configured to wind on top of itself as the second lift strap is spooled onto the second lift spool, the method comprising:

moving the bottom rail to a raised position relative to the headrail;

identifying that the bottom rail has a skewed orientation when at the raised position, the skewed orientation being characterized by the first lift strap defining an effective length that is greater than an effective length of the second lift strap;

moving the bottom rail to a lowered position relative to the headrail; and operatively associating at least one leveling shim with the first lift strap to provide a localized increase in an effective thickness of the first lift strap such that the effective length of the first lift strap will be increased when the bottom rail is subsequently moved back to the raised position.

20. The method of claim 19, wherein the at least one leveling shim comprises a separate piece of material and wherein operatively associating the at least one leveling shim with the first lift strap comprises coupling the separate piece of material to an outer surface of the first lift strap.

21. The method of claim 19, wherein the at least one leveling shim comprises a coating provided on an outer surface of the lift strap and wherein operatively associating the at least one leveling shim with the first lift strap comprises applying the localized coating to the outer surface of the first lift strap.

22. The method of claim 19, wherein operatively associating the at least one leveling shim with the first lift strap comprises deforming a portion of the first lift strap relative to adjacent portions of the first lift strap such that the deformed portion of the first lift strap forms a leveling shim providing the localized increase in the effective thickness of the first lift strap.

23. The method of claim 19, further comprising selecting at least one of a thickness, length, number, or location of the at least one leveling shim such that the effective length of the first lift strap is substantially equal to the effective length of the second lift strap when the bottom rail is subsequently moved back to the raised position.

* * * * *